US011617187B2

(12) United States Patent
Changlani et al.

(10) Patent No.: US 11,617,187 B2
(45) Date of Patent: Mar. 28, 2023

(54) SYSTEMS AND METHODS FOR PRIORITIZING BI-DIRECTIONAL TRAFFIC FLOWS

(71) Applicant: HEWLETT PACKARD ENTERPRISE DEVELOPMENT LP, Houston, TX (US)

(72) Inventors: Nitin A. Changlani, Santa Clara, CA (US); Qiang Zhou, Santa Clara, CA (US); Sachin Ganu, Santa Clara, CA (US); Hao Lu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 252 days.

(21) Appl. No.: 17/083,261

(22) Filed: Oct. 28, 2020

(65) Prior Publication Data
US 2022/0132528 A1    Apr. 28, 2022

(51) Int. Cl.
*H04W 72/12* (2009.01)
*H04W 28/02* (2009.01)
*H04W 74/06* (2009.01)
*H04W 84/12* (2009.01)
*H04W 74/00* (2009.01)
*H04W 72/1263* (2023.01)
*H04W 72/121* (2023.01)

(52) U.S. Cl.
CPC ... *H04W 72/1242* (2013.01); *H04W 28/0278* (2013.01); *H04W 72/121* (2013.01); *H04W 72/1263* (2013.01); *H04W 72/1284* (2013.01); *H04W 74/06* (2013.01); *H04W 74/006* (2013.01); *H04W 84/12* (2013.01)

(58) Field of Classification Search
None
See application file for complete search history.

(56) References Cited

U.S. PATENT DOCUMENTS

| 7,421,273 | B2 | 9/2008 | Diepstraten et al. |
| 9,107,230 | B2 | 8/2015 | Jin et al. |
| 10,524,145 | B1 * | 12/2019 | Das .................. H04W 24/08 |

(Continued)

FOREIGN PATENT DOCUMENTS

CN          108601048          9/2018

OTHER PUBLICATIONS

Ando, R. et al., Characterization of Priority Control based on Media Access Control Method SP-MAC over WLAN, (Research Paper), 19th International ICIN Conference—Innovations in Clouds. Internet and Networks—Mar. 1-3, 2016, pp. 149-156.

*Primary Examiner* — Jutai Kao
(74) *Attorney, Agent, or Firm* — Sheppard Mullin Richter & Hampton LLP

(57) ABSTRACT

Systems and methods are provided for synchronizing uplink (UL) and downlink (DL) traffic. In particular, frames associated with Quality of Service (QoS)-sensitive traffic flows to be transmitted in a first direction are prioritized commensurate with frames to be transmitted in a second direction, different/opposite to that of the first direction. For example, UL traffic flows can be prioritized based on DL traffic flows, where the traffic flows belong to the same application flow, and vice versa, where DL traffic flows can be prioritized based on UL traffic flows for the same application flow. In this way, end-to-end QoS can be achieved.

19 Claims, 6 Drawing Sheets

(56) References Cited

U.S. PATENT DOCUMENTS

| | | | |
|---|---|---|---|
| 2006/0268716 A1* | 11/2006 | Wijting | H04L 47/10 370/408 |
| 2016/0262173 A1* | 9/2016 | Josiam | H04B 7/0452 |
| 2017/0265210 A1* | 9/2017 | Huang | H04W 72/1252 |
| 2019/0230560 A1 | 7/2019 | Huang et al. | |
| 2019/0268798 A1* | 8/2019 | Jeong | H04W 28/06 |
| 2021/0352522 A1* | 11/2021 | Hwang | H04L 47/26 |
| 2021/0410149 A1* | 12/2021 | Xia | H04W 72/1268 |
| 2022/0132365 A1* | 4/2022 | Barton | H04W 28/0278 |

\* cited by examiner

SYSTEMS AND METHODS FOR PRIORITIZING BI-DIRECTIONAL TRAFFIC FLOWS

DESCRIPTION OF RELATED ART

In recent years, Wireless Local Area Network (WLAN) technologies have emerged as a fast-growing market. One example of the various WLAN technologies is the Institute of Electrical and Electronics Engineers (IEEE) 802.11 standard. Client devices or stations (STAB) within WLANs communicate with access points (APs) to obtain access to one or more network resources. APs can refer to digital devices that may be communicatively coupled to one or more networks (e.g., Internet, an intranet, etc.). APs may be directly connected to the one or more networks or connected via a controller. An AP, as referred to herein, may include a wireless access point (WAP) that communicates wirelessly with devices using Wi-Fi, Bluetooth or related standards and that communicates with a wired network.

APs configure various parameters for communicating with other devices, and for supporting real time services while meeting Quality of Service (QoS) requirements. The specific values configured for various parameters determine the performance of an access point such as speed and reliability.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
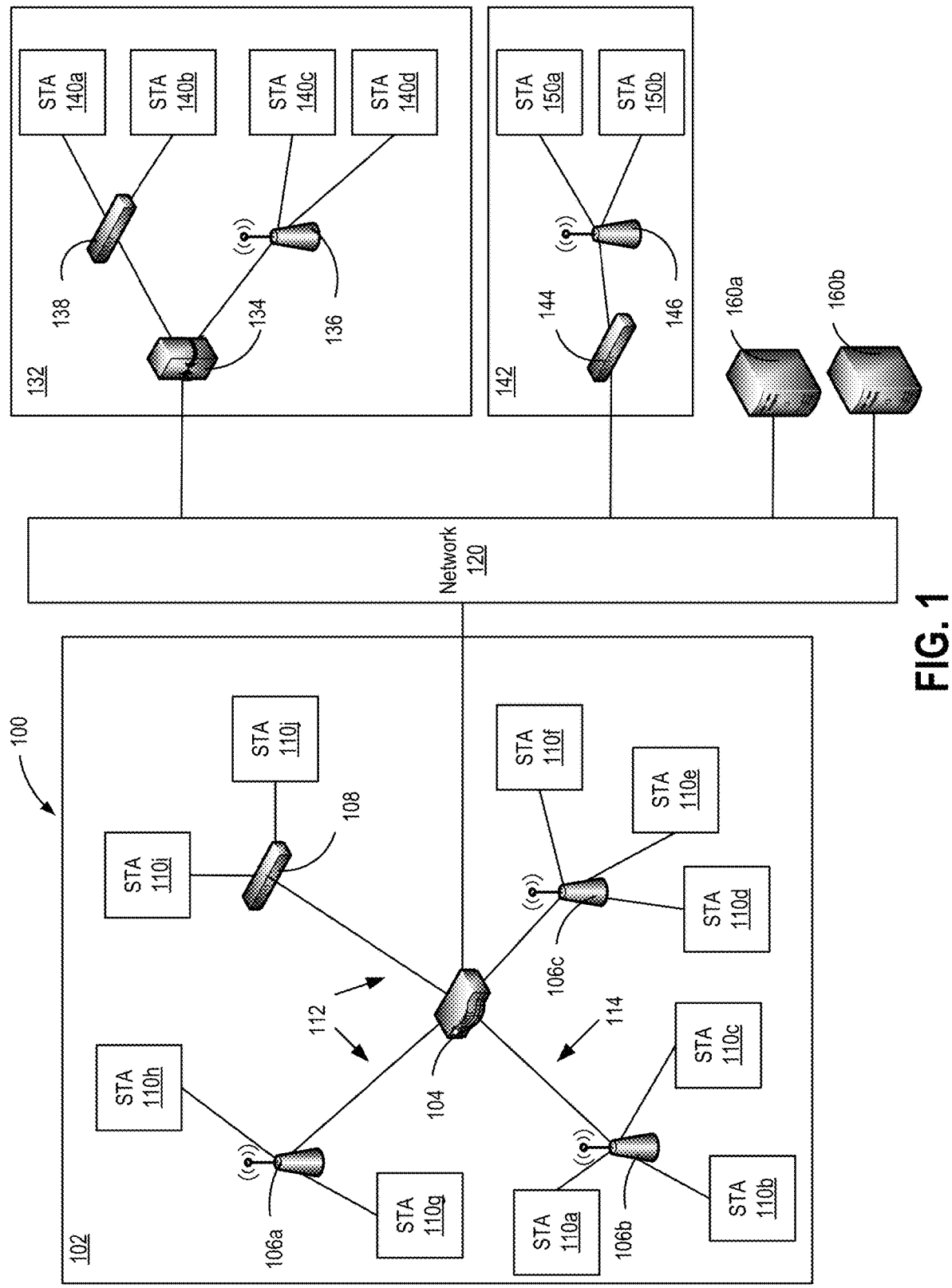
FIG. 1 illustrates an example wireless network deployment in which prioritized bi-directional traffic flows can be implemented in accordance with various embodiments.

The figures are not exhaustive and do not limit the present disclosure to the precise form disclosed.

DETAILED DESCRIPTION

For traffic flows that are quality of service (QoS)-sensitive, multicast transmissions that occur every Delivery Traffic Indication Message (DTIM) period or interval have generally been used over wireless local area networks (WLANs). To ensure reliability, such multicast transmissions may use basic rates. However, this comes at the cost of inefficient use of the airtime. The transmission characteristics of such multicast transmissions can change. For example, a multicast transmission can involve bursty traffic, e.g., progressive download during video streaming. Moreover, QoS-sensitive transmissions, such as 4K video, virtual reality traffic, and the like, can also be throughput intensive. Thus, many conventional applications and stack implementations have been modified to use unicast instead of multicast transmissions for such (bursty, throughput intensive, etc.) types of traffic flows.

Some conventional systems may also use TCP vs UDP for the aforementioned flows. The expectation is that such conventional applications and networks ensure that these unicast Transmission Control Protocol (TCP)/User Datagram Protocol (UDP) traffic flows are queued for transmission over access categories (AC) that enhance QoS. However, even if traffic flow queuing commensurate with a desired QoS can be ensured, there is no guarantee that the QoS will be maintained over the round-trip at the data link layer/layer 2. For example, a 4K video streaming application may send its data frames using TCP in accordance with a set of parameter values corresponding to a high priority AC, e.g., a video (VI) AC. However, a receiving STA may still generate TCP acknowledgements (ACKs) that are tagged to use a lower priority AC, e.g., a best effort (BE) AC. Similarly, a bi-directional application (one in which associated traffic flows include both uplink (UL) and downlink (DL) may suffer reduced QoS because the reverse link is not equally prioritized by its transmitter.

Moreover, depending on a variety of factors, there are instances when frames of certain traffic flows may not be sent according to an AC that enhances QoS. Examples of such factors include, but are not limited to how frames are tagged by an application, how networks handle the type-of-service (ToS) tag in an IP header of the frames, how the ToS converts to an AC used for transmission over a WLAN network, etc. Thus, a video application may queue frames in accordance with the BE AC, and not according to the VI AC. Although various systems and methods have addressed the prioritization of forward-traffic (e.g., TCP data segments) by performing prioritized queuing and scheduling for specific applications, reverse-traffic (e.g., TCP ACKs or other reverse traffic) is left un-prioritized in conventional systems.

Therefore, in accordance with various embodiments, frames associated with QoS-sensitive traffic flows to be transmitted in a first direction are prioritized commensurate with frames to be transmitted in a second direction, different/opposite to that of the first direction. For example, UL traffic flows can be prioritized based on DL traffic flows, where the traffic flows belong to the same application flow, and vice versa, where DL traffic flows can be prioritized based on UL traffic flows for the same application flow. For example, in a video conference call context, data packets carrying voice may be transmitted on the DL from an AP to a user's laptop device. Because the traffic flow is in the DL direction, the AP has a chance to prioritize the data packets it transmits. However, in the reverse direction (in this case in the UL direction), an AP has no control regarding what AC is used for transmitting data packets from the user's laptop device to the AP and/or how the channel is accessed by the user's laptop to effectuate the transmission of the data packets. Because traffic may have both UL and DL components or portions, it would be preferable to have symmetry or synchronization of QoS between the UL and DL components/portions of traffic. In this way, end-to-end QoS can be achieved.

In order to prioritize UL traffic, UL traffic fora particular QoS-sensitive application flow can be scheduled more frequently. UL buffer status can be polled at each STA to estimate UL queue-depth at each STA. STAs are sorted in accordance with priority of application flows and buffer status. The AC using which each UL transmission is to be transmitted (during triggering) can be determined. The mode of UL transmission is also determined (e.g., whether the UL transmission is accomplished using full or partial bandwidth Multi-User Multiple Input Multiple Output (MU-MIMO), MU-Orthogonal Frequency Division Multiple Access (OFDMA), or a hybrid combination thereof).

In order to prioritize traffic in the DL direction based on UL traffic flows, all UL traffic flows associated with a QoS-sensitive application flow are identified. The appropriate AC associated with the identified UL traffic flows can be determined. The AC associated with the DL traffic flows can be set to be at least the same as that of the UL traffic flows, or in some embodiments, the selected AC can be higher priority than that of the UL traffic flows.

Before describing embodiments of the disclosed systems and methods in detail, it is useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices/STAs 110a-j. Using a connection to a switch 108 or AP 106a-c, a STA 110a-j may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STA 110i-j. STAs 110i-j may connect to the switch 108 and through the switch 108, may be able to access other devices within the network configuration 100. STAs 110i-j may also be able to access the network 120, through the switch 108. The STAs 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for STAs 110a-h. Each of APs 106a-c may be a combination of hardware, software, and/or firmware that is configured to provide wireless network connectivity to wireless STAs 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

It should be noted that APs, such as AP 130, AP 132, and AP 134 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

It should be understood that wireless communications as contemplated herein may involve the configuration of one or more parameters which determine a QoS for communication by or with WLAN devices, such as, e.g., APs. Parameter values determine how frequently WLAN devices request access to a radio frequency channel and/or use a radio frequency channel. Parameter values for a particular WLAN device that result in a radio frequency channel (or an overlapping portion of two radio frequency channels) being accessed more often by that particular WLAN device relative to other WLAN devices may be referred to herein as aggressive parameter values. In addition, parameter values that are more aggressive relative to default or industry-standard parameter values for obtaining channel access may also be referred to herein as aggressive parameter values. Examples of parameters are Enhanced Distributed Channel Access (EDCA) parameters and Hybrid Coordination Function Controlled Channel Access (HCCA) parameters.

EDCA parameters may include, but are not limited to the following:

a. Access Category—An access category parameter refers to one of a voice AC, a video AC, a best effort AC, and a background AC. There may be more ACs as described in the 802.11 standard and each AC may be associated with a different priority level.

b. Arbitration Inter-Frame Spacing (AIFS)—A time interval between frames being transmitted under the IEEE 802.11 standard.

c. Minimum Contention Window (CWmin)—Input to an algorithm that determines the initial random backoff wait time for retry of a transmission in response to failed attempt (for example, due to unavailability of a radio frequency channel). The random backoff wait time may be increased when a frame transmission is unsuccessful due to the channel being unavailable for the transmission.

d. Maximum Contention Window (CWmax)—The maximum random backoff wait time.

e. Maximum Burst—The maximum burst length allowed for packet bursts (collection of multiple frames transmitted without header information) on the wireless network.

f. Transmission Opportunity (TXOP) Limit—An interval of time when a client device has the right to initiate transmissions toward an Access Point and send as many frames as possible.

g. Beacon Interval—An interval of time between beacon frame transmissions. A beacon frame is one of the management frames in IEEE 802.11 based WLANs and includes information about the network. A beacon frame broadcasted by an access point may include values for parameters associated with that access point.

h. DTIM Period—A number that determines how often a beacon frame includes a DTIM. A value of the DTIM is included in each beacon frame. A DTIM is included in beacon frames to indicate to the client devices whether the access point has buffered broadcast and/or multicast data waiting for the client devices.

In some embodiments, and as alluded to above, ACs are defined for classifying network traffic. Each AC (configured for an AP) is associated with a corresponding set of parameter values. The transmission of frames classified under a particular AC can be transmitted according to the set of parameter values corresponding to that particular AC. That is, ACs can be likened to queues that an AP can populate with data, and from which that data can be transmitted. Typically, there are four types of ACs (described below) that can be assigned to different types of applications, each having its own particular QoS requirements/parameters. Moreover, once an AC is assigned to an application type, the manner in which traffic/data is queued in an AC, along with the manner in which traffic/data is taken out of the queue can be configured. It should be understood that a particular AC can be associated with one or more queues/sub-queues.

Table 1 below shows an example of four ACs (background (BK), best effort (BE), video (VI), and voice (VO)) and respective parameter values as configured for a first AP.

TABLE 1

| AC | CWmin | CWmax | AIFS | Max. TXOP |
|---|---|---|---|---|
| Background (BK) | 15 | 1023 | 7 | 0 |
| Best Effort (BE) | 15 | 1023 | 3 | 0 |
| Video (VI) | 7 | 15 | 2 | 3.008 ms |
| Voice (VO) | 3 | 7 | 2 | 1.5404 ms |

In the above example, frames classified under the video category are transmitted by the first AP using value 7 for CWmin, value 15 for CWmax, and value 2 for AIFS. A second AP may be configured differently than the first AP by using different parameter values.

Table 2 below shows an example of four ACs and associated parameter values as configured for a second AP that is different than the first AP.

TABLE 2

| AC | CWmin | CWmax | AIFS | Max. TXOP |
|---|---|---|---|---|
| Background (BK) | 15 | 1023 | 7 | 0 |
| Best Effort (BE) | 15 | 1023 | 3 | 0 |
| Video (VI) | 5 | 10 | 1 | 3.008 ms |
| Voice (VO) | 3 | 7 | 2 | 1.5404 ms |

In the above example, frames classified under the VI AC are transmitted by the second AP using value 5 for CWmin, value 10 for CWmax, and value 1 for AIFS. The second AP can be configured more aggressively than the first AP because the second AP has lower values for CWmin, CWmax, and AIFS. This can result in more frequent attempts to obtain channel access and more frequent transmission of frames.

The first AP and the second AP compete for access to the shared radio frequency channel. In an example, the first AP attempts to transmit packets for a particular video stream at the same time the second AP is transmitting a first set of packets for another video stream. Since the radio frequency channel is unavailable to the first AP (the radio frequency channel is being used by the second AP to send the first set of packets), the first AP again attempts to transmit after a random period of time that is computed based at least on CWmin and CWmax. The random period of time may be referred to herein as a random backoff time. However, the second AP may be transmitting a second set of packets when the first AP attempts again because the lower values for CWmin and CWmax used by the second AP result in the second AP requesting channel access more frequently than the first AP. Furthermore, the second AP transmits more frames per time period than the first AP because the AIFS parameter value is lower for the second AP. The difference in parameter values results in the second AP using a channel, shared with the first AP, for a larger percentage of time than the first AP to transmit video data.

Figure 2A:
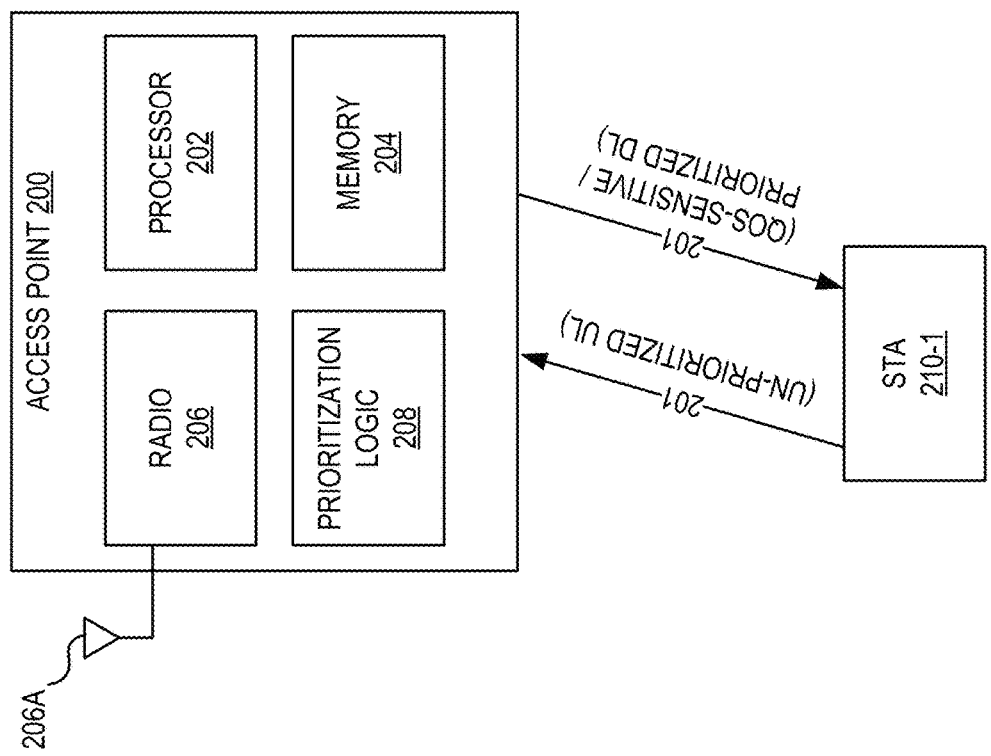
FIG. 2A illustrates an example access point (AP) in accordance with various embodiments, where uplink (UL) traffic is un-prioritized on a channel and downlink (DL) traffic on the same channel is prioritized.

FIG. 2A is a schematic representation of an example AP 200 in accordance with one embodiment. AP 200 may be a network device that can include, e.g., one or more of: a processor 202, memory/data storage 204, a radio 206 (and corresponding antenna 206A), and prioritization logic 208.

Memory 204 may include a fast read-write memory for storing programs and data during the AP 200's operations and a hierarchy of persistent memory such as ROM, EPROM, and Flash memory for storing instructions and data needed for the startup and/or operations of AP 200. Memory 204 may store data that is to be transmitted from AP 200 or data that is received by AP 200. In some embodiments, memory 204 is a distributed set of data storage components. Although not shown, it should be understood that AP 200 may further include input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces.

Processor 202 is coupled to at least memory 204. Processor 202 may be any processing device including, but not limited to a MIPS-class processor, a microprocessor, a digital signal processor, an application specific integrated circuit, a microcontroller, a state machine, or any type of programmable logic array.

Radio 206 may be a 5 GHZ radio, a 2.4 GHZ radio, or other appropriate wireless communications component for effectuating wireless communications. Radio 206 may be configured to both transmit and receive data. Radio 206 may be dedicated to a communication channel 201. In some examples, communication channel 201 operates on a communication band (e.g., 5.0 GHz UNII band) and operates in accordance with a particular wireless specification (e.g., 802.11ax). For example, by operating in accordance with the particular specification such as IEEE 802.11ax, communication channel 201 can employ OFDMA, spatial reuse, MU-MIMO, and/or combinations thereof. By extension, a wireless client device/STA having a capacity of complying with the particular wireless specification can, in such examples, have the capacity for employing OFDMA, spatial reuse, UL MU-MIMO, and/or combinations thereof. It should be understood that AP 200 may have a plurality of radios (physical and/or logical), and may have dedicated or shared channels for each radio or group(s) of radios.

In one embodiment, prioritization logic 208 may include one or more functional units implemented using firmware, hardware, software, or a combination thereof for configuring parameters associated with AP 200 for the transmission of data/frames to and from AP 200. Although, prioritization logic 208 is shown as being implemented on AP 200, one or more physical or functional components of the prioritization logic 208 may be implemented on a separate device, such as an AP controller, an example of which may be controller 104 of FIG. 1.

For traffic flows that are tagged to be prioritized, various embodiments prioritize those frames being sent in the reverse direction (e.g. UL direction where the forward traffic is in the DL direction) based on the prioritization set for the frames being sent in the forward direction (e.g. DL direction where the reverse traffic is in the UL direction), and vice-versa. As illustrated in FIG. 2A, AP 200 may be receiving frames from STA 210-1 over communications channel 201 in the UL direction, while transmitting frames to STA 210-1, in the DL direction. As noted above, and commensurate with this example scenario, frames or data packets being sent to AP 200 in the UL direction from STA 210-1 (e.g., as in the case of video conference frames being sent from a laptop to home AP) are not prioritized, whereas frames or data packets being sent from the AP to STA 210-1 in the DL direction can be prioritized. As will be discussed in greater detail below with respect to FIG. 2B, one embodiment synchronizes UL/DL communications or creates symmetry therebetween.

It should be understood that various embodiments are able to effectuate bi-directional prioritization in a variety of scenarios. For example, in some communication scenarios, the flow of data may be heavily skewed in a particular direction. That is, the flow of data may be more prevalent in one direction, i.e., the transmit or receive direction, relative to another direction, i.e., the receive or transmit direction, respectively. For example, in the case of an AP, such as AP 200, a heavily skewed traffic flow may involve DL TCP traffic where the corresponding UL traffic is made up of TCP ACKs. Another example may involve UL TCP traffic, where the corresponding DL traffic is again, made up of TCP ACKs. Further still, bi-directional traffic flows, such as UDP traffic flows, can be skewed in a particular direction.

In other communication scenarios, the flow of data may be bi-directional in nature. For example, an AP, such as AP 200, may effectuate bi-directional traffic flows vis-à-vis a bi-directional set of TCP and/or UDP traffic flows with comparable/similar amounts of traffic in both the UL and DL directions.

It should be understood that the bi-directional prioritization of traffic flows/data transmission as disclosed herein need not be limited for use with APs/AP controllers, but may be used to prioritize bi-directional traffic in non-AP devices that, e.g., operate in peer-to-peer or mesh network topologies. Hence, various embodiments disclosed and/or contemplated herein can be used to enhance the conventional queuing and/or scheduling of data, frames, etc. in two (UL and DL) directions relative to a given device. The enhanced queuing/scheduling of data can also be applied or leveraged on a per-application basis, thus providing a mechanism(s) for differentiating between applications in the reverse direction. That is, if a network, e.g., network 100 (FIG. 1) or some portion(s) thereof become overloaded, certain applications may be afforded a higher priority than others.

As used herein, the term "traffic flow" can refer to a stream of data packets, e.g., segments or datagrams, that share the same 5-tuple. It should be understood that the aforementioned 5-tuple can refer to a set of five different values that comprise a TCP/IP connection, and includes: source IP address; a destination IP address; a source port address; a destination port address; and the protocol in use (TCP/UDP).

As used herein, the term "application flow" can refer to a group of traffic flows (5-tuples) that an application may use for communication. That is, an application flow can have multiple traffic flows, each of which may have differing transmission priorities. For example, in a video conference call, a first traffic flow belonging to the video conference call application flow may be a voice traffic flow, a second traffic flow may be a screen sharing traffic flow, a third traffic flow may be a chat traffic flow, a fourth traffic flow may be a video traffic flow, etc. The manner in which data (transmitted by/in an application) is characterized may be specified, e.g., by a developer or other entity controlling the application, providing the application, etc., such that deep packet inspection (described below) can be used to identify and classify this data traffic so that it can be assigned to an appropriate AC, and ultimately, as disclosed herein, prioritized.

It should be noted that deep packet inspection can be performed on traffic flows to determine whether the segments/datagrams for a particular traffic flow belong to a specific application flow or not. For example, the metadata associated with a particular application flow can contain or may include the set of traffic flows (each traffic flow having an associated 5-tuple, a set of five different parameter values that identifies a UDP/TCP session) that the particular application flow uses at a given point during the transmission/receipt of data from/at the AP, in addition to the directional characteristics of the traffic flows. It should be understood that deep packet inspection can determine what traffic flow (s) are associated with the same application flow, and as alluded to above, can be performed to determine whether a particular traffic flow (of an application flow) is strictly uni-directional (e.g., a UDP traffic-flow in only one direction). Deep packet inspection may be performed to determine if a traffic flow is bi-directional with data flowing in only one direction (e.g., a TCP traffic flow with data being transmitted in one direction and ACKs being received in the opposite direction, or a pair of UDP traffic flows with a first traffic flow that is heavier than a second traffic flow). Deep packet inspection can be performed to determine if a traffic flow is bi-directional with data flowing in both directions (e.g., a bi-directional TCP flow with data and piggybacked ACKs in both directions, or a pair of UDP traffic flows, where each of the UDP traffic flows are equally or similarly heavy (from a throughput perspective and/or from a latency tolerance perspective). In terms of throughput, heavy traffic flows are traffic flows such as those similar to a file transfer (e.g., regarding file sizes on the order of a few MB/long stream of PPDUs with possibly large PPDU sizes). From a latency tolerance perspective, heavy traffic flows can refer to traffic that is less latency tolerant, e.g., voice traffic, where a packet may be generated once every 20 ms for example, and once generated, it is required to be transmitted and successfully received within a stringent time boundary.

It should be understood that the prioritization of traffic in a uni-directional case, especially in the case of DL traffic, may depend on internal software/hardware implementation aspects/characteristics that can impact or change the scheduling of traffic. That is, by analyzing the metadata of an application flow, AP implementations ensure that those traffic flows which belong to a high-priority application flow are scheduled with a commensurately higher priority over the air. For example, this can be accomplished by increasing the scheduling frequency for the traffic flows of an application flow, and/or by ensuring that the AC in accordance with which data packets in a traffic flow are transmitted (and in accordance with any QoS requirement(s) of an application) is at least the same, even if the application has not marked the data packets making up its traffic flows according to its QoS requirements.

In this way, DL traffic of a particular application flow can be prioritized, and the level of priority that should be assigned to UL traffic associated with the same application flow can at least be the same. Similarly, an application flow that is independently prioritized by a STA in/for the UL direction, can be used as an indication of the level of priority that should be assigned to the DL traffic for the same application flow.

Figure 2B:
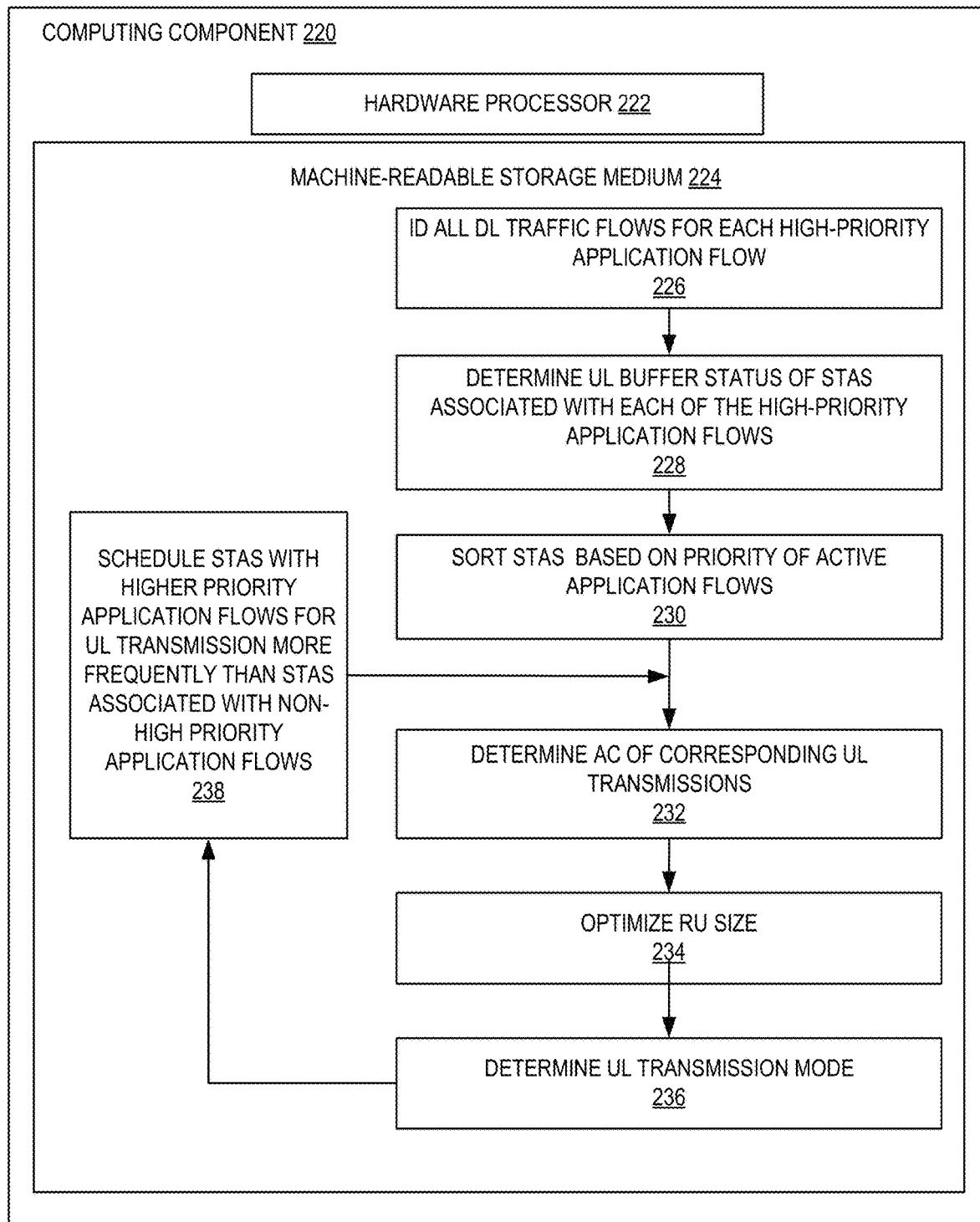
FIG. 2B illustrates an example computing component for effectuating prioritized uplink (UL) traffic flow based on downlink (DL) traffic flow in the AP of FIG. 2A in accordance with one embodiment.

FIG. 2B is a block diagram of an example computing component or device 220 for prioritizing UL traffic flow based on DL traffic flow for a particular application flow in accordance with one embodiment. Computing component 220 may be, for example, a server computer, a controller, or any other similar computing component capable of processing data. In the example implementation of FIG. 2B, computing component 220 includes a hardware processor, 222, and machine-readable storage medium, 224. In some embodiments, computing component 220 may be an embodiment of a controller, e.g., a controller such as controller 104 (FIG. 1), or another component of wireless network 100, e.g., an AP such as AP 106a (FIG. 1), for example.

Hardware processor 222 may be one or more central processing units (CPUs), semiconductor-based microprocessors, and/or other hardware devices suitable for retrieval and execution of instructions stored in machine-readable storage medium, 224. Hardware processor 222 may fetch, decode, and execute instructions, such as instructions 226-238, to control processes or operations for prioritizing bi-directional traffic flows. As an alternative or in addition to retrieving and executing instructions, hardware processor 222 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 224, may be any electronic, magnetic, optical, or other physical storage device that contains or stores executable instructions. Thus, machine-readable storage medium 224 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 224 may be a non-transitory storage medium, where the term "non-transitory" does not encompass transitory propagating signals. As described in detail below, machine-readable storage medium 224 may be encoded with executable instructions, for example, instructions 226-238.

Hardware processor 222 may execute instruction 226 to identify all DL traffic flows for each high-priority application flow. As discussed above, deep packet inspection can be performed on traffic flows to determine whether the segments/datagrams for a particular traffic flow belong to a specific application flow or not.

Hardware processor 222 may execute instruction 228 to determine the UL buffer status of clients associated with each of the high-priority application flows. In order to assist in determining/setting UL scheduling frequency and a mode of transmission for prioritized traffic, an estimation of the UL traffic requirements from a destination device for the application flow can be determined. Since the UL queue-depth on a destination STA may change based on a variety of factors (e.g., the application's behavior, the rate of data consumption on the STA, etc.) estimating UL queue-depth can be performed in real-time at frequent intervals. The 802.11ax standard provides the capability to poll the buffer status on a STA using a Buffer Status Report Poll (BSRP) trigger frame which an AP can use to estimate the UL queue-depth on the STA at any point in time. For high-priority application flows, the BSRP trigger can be appended to the end of a WLAN frame (PPDU) sent on the DL. This appending of the BSRP trigger can be done for all frames or with certain periodicity, such that the response (QoS Control frames or BSR frames) to the BSRP trigger from the STA can be received at a rate that describes the current queue-depth on the STA with sufficiently better confidence than other clients with non-high-priority traffic.

Hardware processor 222 may execute instruction 230 to sort the STAs based on priority of application flows that are active/currently in progress. Given the UL buffer status for all STAs (ones with prioritized application flows as well as the ones without), the STAs can be sorted based on the priority of the application flows that are currently active (i.e., there is traffic in the UL queue to be transmitted). This prioritized list of STAs will be provided channel access in a manner that is equivalent to that used for the DL transmissions by the AP, thereby synchronizing UL with DL transmissions/creating symmetry between UL and DL traffic flows that belong to the same application flow. The STAs with higher priority application flows will be scheduled for UL transmissions more often than the other STAs. Such STAs will also be provided more channel resources for their transmissions. This increase in channel resources translates to larger resource units (RUs) in the case of scheduled UL OFDMA, or a greater number of spatial streams in the case of scheduled UL MU-MIMO.

Hardware processor 222 may execute instruction 232 to determine the AC of corresponding UL transmissions. The contents of the response to a BSRP provides the AP with the number of bytes queued in each AC on a STA. The AP can then use a trigger frame to schedule the STA to transmit frames in the UL direction using OFDMA, MU-MIMO, or a combination thereof. In some embodiments, the trigger frame may include a "Preferred AC" field which is indicative of the lowest AC from which the STA can dequeue packets for transmission in the UL direction. Determination of the Preferred AC reflected in the Preferred AC field is described below.

Using the 5-tuple of the traffic flows for a given application flow, the AC that is used by the STA for the given application flow may be determined. This AC will be programmed as the Preferred AC in trigger frames transmitted from the AP to a STA. In other words, the "lowest" AC from which the STA can dequeue packets for transmission is commensurate with the high priority AC associated with the high priority application flow. Determining the AC in this manner ensures that the low priority traffic that is enqueued on other ACs (lower than the AC used by the high priority application flow) do not access the channel that is scheduled by the AP for the STA. This can prevent a STA from using the priority (preferred AC) that has been "reserved" for the traffic flow(s) associated with the high priority application flow for its other traffic. However, once an application flow is deemed high priority, all traffic flows belonging to that high priority application flow are treated as high priority traffic flows.

It should be understood that trigger frames can be used to relay information (from an AP) regarding the time when a STA can begin transmitting its queued data/packets/frames to the AP, along with information regarding transmit rate, transmit power, RU size (discussed above), and spatial streams/subchannels allocated to the receiving STA. With the use of such trigger frame information, in conjunction with the Preferred AC field information, a STA can be made/instructed to transmit its queued frames according to the desired priority (discussed in greater detail below).

Hardware processor 222 may execute instruction 234 to optimize RU size for UL transmission. As described above, all DL traffic for each high-priority application flow can be identified, UL buffer status of STAs associated with the identified DL traffic can be obtained, and STAs can be sorted, e.g., into a list reflecting various application flow priorities. The STA of the sorted/listed STAs having the highest priority is the one for which RU size is maximized. The RU assignment to other STAs can be prioritized against other STAs, both in terms of how often they are assigned the RUs (selected for OFDMA transmissions) as well as the size of the RUs. In some embodiments, the RU size assigned to STAs with the smaller UL queue-depth will be proportional to airtime determined by the number of bytes queued in the STA. For STAs with larger UL queue-depth(s), the entire channel width can be allocated for the RU. It should be understood that UL queue-depth can be implementation-dependent, and thus, in some embodiments, an applicable queue-depth threshold can be specified against which STA queue-depth can be compared to determine if the queue-depth is "smaller" than the threshold or "larger" than the threshold.

Hardware processor 222 may execute instruction 236 to determine the UL transmission mode for each STA. In some embodiments, UL MU-MIMO can be used for data transmission within RUs for STAs with high priority application flows for transmitting frames from those STAs to the AP. STAs with smaller UL queue-depth (measured in bytes) may be configured to use UL MU OFDMA. For clients with a limited number of antennas, again, partial bandwidth UL MU-MIMO can be used within the RU, effectively sharing it between the high-priority STAs, while ensuring the latency among the high-priority STAs is minimized. For STAs with larger UL queue-depth, which as noted above, can be allocated an entire channel-width for the RU, full bandwidth UL MU-MIMO can still be used across STAs. It should be noted that even in this case, such STAs are prioritized in terms of the number of times they are grouped for MU-MIMO transmissions and the number of spatial streams assigned to them.

Hardware processor 222 may execute instruction 238 to schedule STAs with higher priority application flows for UL transmission more frequently than STAs associated with non-high-priority application flows. When traffic for a bi-directional application flow is prioritized, various embodiments make it possible for an entity or network device, such as an AP, to also prioritize UL traffic from a STA(s) for the same application flow. In accordance with the 802.11ax standard, an AP may schedule UL transmissions on STAs using trigger frames, without requiring stations to contend for the channel. Thus, the prioritization of traffic as disclosed herein need not come at the cost of contention. Destination STAs for the DL traffic of prioritized bi-directional application flows can be given a higher priority for being scheduled for UL transmissions as well. This will ensure that the application flows obtain better channel access than all the other traffic for other clients in a wireless network. It should be noted that from the perspective of a particular STA that gets a prioritized UL schedule, may also have other traffic flows that do not belong to the prioritized application flow. Nevertheless, these other traffic flows may also see better performance as well (a side effect of the manner in which the 802.11ax standard provides UL scheduling capability). It should be noted that various embodiments improve upon an approach that may rely on Traffic Specification (TSpec) mechanisms since TSpec is required to be initiated by a STA, and as already discussed above, an AP does not necessarily have this level of control over a STA transmitting in the UL direction, and moreover, it is session-based. On the other hand, scheduled UL transmissions initiated by an AP is more granular since it can be done on a per-Physical Layer Protocol Data Unit (PPDU) basis. Moreover, using TSpec would not help in cases where the client does not use the highest AC for the high-priority traffic flows.

It should be noted that the aforementioned method of prioritizing traffic can account for all cases of bi-directional traffic where UL traffic is prioritized based on DL traffic. That is, consider a scenario where a high-priority application flow has DL traffic that exceeds the corresponding UL traffic. In this case, traffic in the UL direction will be prioritized using UL OFDMA frames. Again, as noted above, those STAs with smaller UL queue-depth (which would be the case when traffic is heavily skewed in the DL direction), UL OFDMA can be selected as the UL transmission mode of choice. In a scenario where traffic on the UL and DL directions is equivalent or similar (based on an implementation-dependent threshold), the frames in the UL (reverse) direction will be prioritized with the use of UL OFDMA and/or full/partial bandwidth UL MIMO frames. In a scenario where traffic in the DL direction is less than that in the UL direction, traffic in the UL direction can be prioritized using UL MIMO frames. Application flows that fall into this category may include cases where an application sends a small frame(s) to trigger traffic from the STA side in UL direction.

Figure 2C:
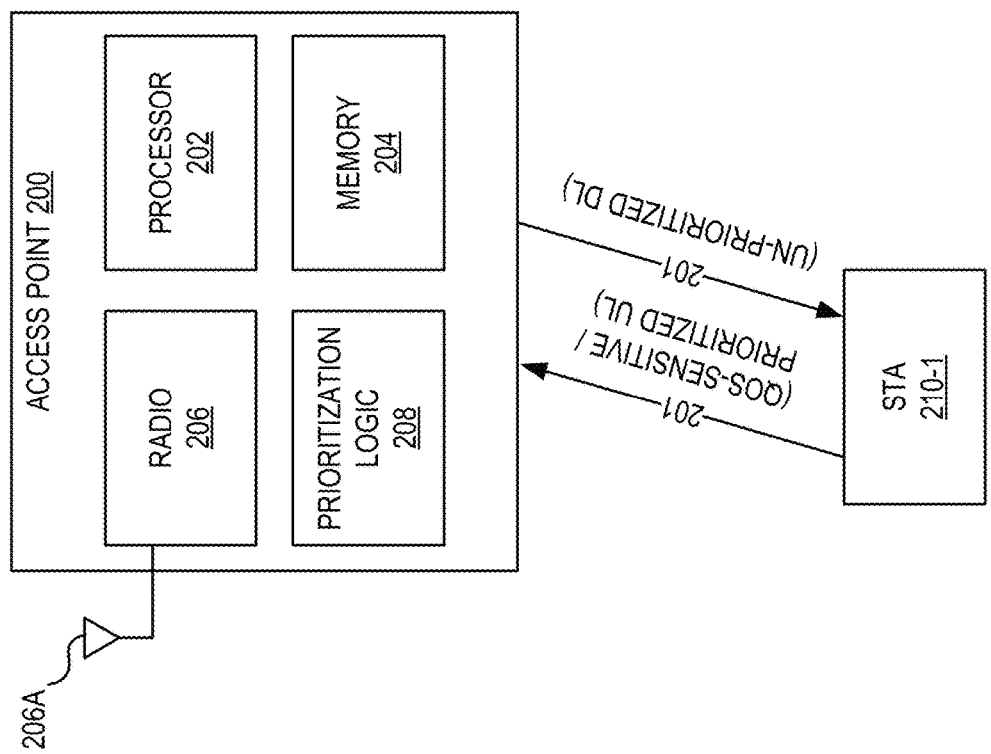
FIG. 2C illustrates an example access point (AP) in accordance with various embodiments.

FIG. 2C illustrates another scenario where UL traffic is prioritized and DL traffic is not. That is, AP 200 may be receiving frames from STA 210-1 over communications channel 201 in the UL direction, while transmitting frames to STA 210-1, in the DL direction. In some scenarios, priority for traffic can be initiated by a STA, and is so-indicated by the AC that the STA uses for its UL transmissions. However, in the DL direction, the same priority may not necessarily be reflected. That is, DL traffic in this scenario may comprise, e.g., TCP ACK messages that are not tagged by the application/stack as needing to comport with a particular transmission priority. It should be noted that even when such TCP ACKs have been tagged with the proper Type of Service (ToS) in a ToS field, network devices in the transmission path may change the ToS associated with the TCP ACK messages. More generally, it should be understood that in other bi-directional transmission scenarios, a STA may use a higher priority AC for UL traffic on its own, while the AP to which the STA is attached has no basis for prioritizing the DL component/portion of the traffic flow.

Figure 2D:
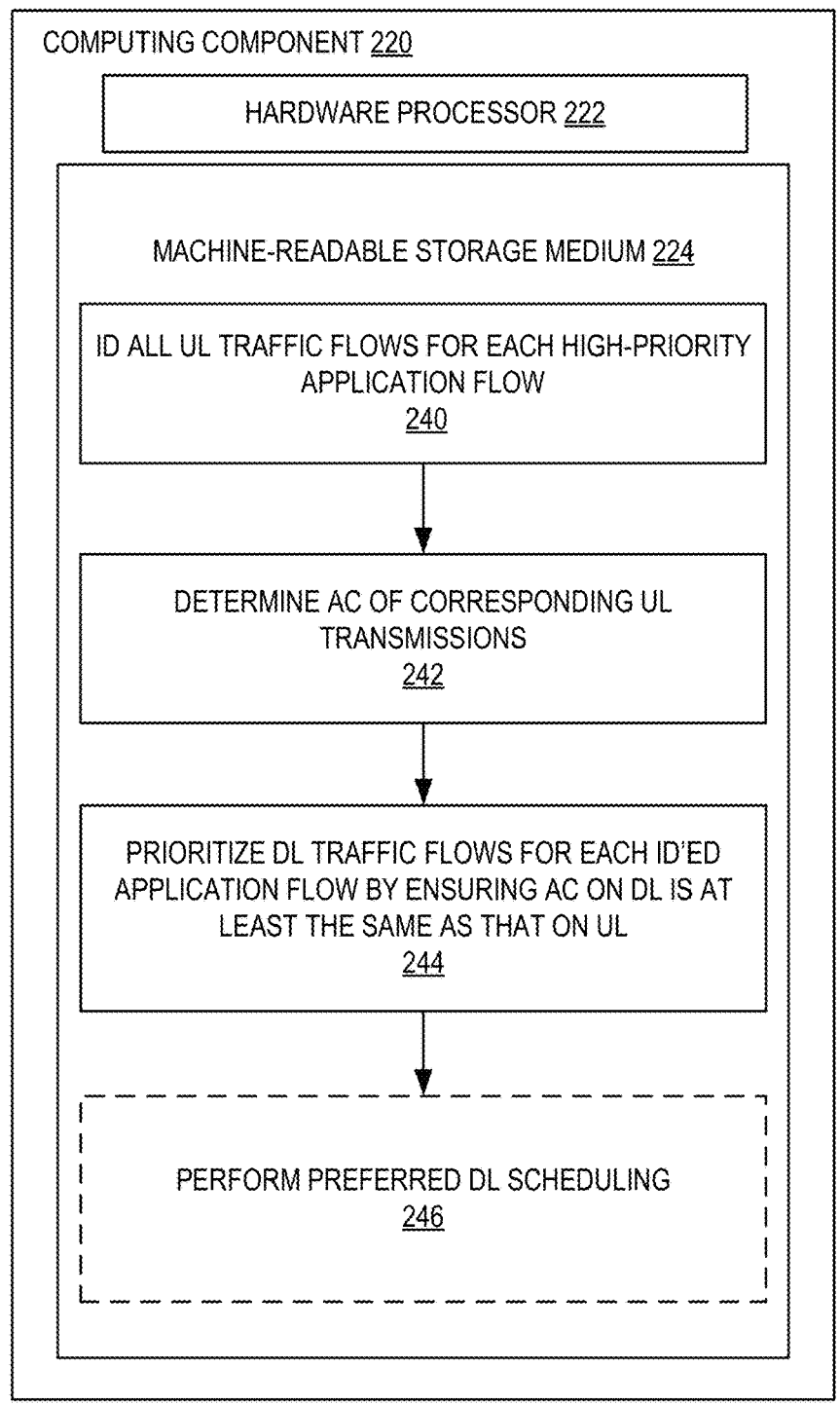
FIG. 2D illustrates an example computing component for effectuating prioritized downlink (DL) traffic flow based on uplink (UL) traffic flow in the AP of FIG. 2A in accordance with one embodiment.

FIG. 2D is a block diagram of the example computing component or device 220 that can also prioritize DL traffic flows based upon UL traffic flows of a particular application flow in accordance with one embodiment. As described above, computing component 220 includes a hardware processor, 222, and machine-readable storage medium, 224. As described in detail below, machine-readable storage medium 224 may be encoded with executable instructions, for example, instructions 240-246.

Hardware processor 222 may execute instruction 240 to identify all UL traffic flows for each high-priority application flow traversing an AP. Similar to instruction 226 (FIG. 2A), deep packet inspection may be performed to accomplish this identification operation.

Hardware processor 222 may execute instruction 242 to determine the AC of the corresponding UL transmissions, i.e., those UL transmissions that make up the UL portion of the high priority application flow to which the identified DL traffic flows also belong. By tying DL traffic flows for a given application flow to that of the UL traffic flows based on the 5-tuple used in the UL traffic, the AC for the DL traffic is ensured to be at least equal to that of the UL traffic. In some embodiments, preferred scheduling for DL traffic (described below) can be effectuated, regardless of or independent of which AC the DL traffic is transmitted on, in order to achieve symmetric/synchronized DL/UL traffic flows.

Thus, hardware processor 222 may execute instruction 244 to prioritize DL traffic flows for each identified high-priority application flow by ensuring the AC according to which DL traffic is sent is at least the same as that used with UL traffic flows for the same application flow. In some scenarios, the same AC is used for the DL and UL traffic flows of the same application flow. In some scenarios, a higher priority AC can be used for the DL traffic flows relative to the AC used for the UL traffic flows. For example, there may be other traffic flows to schedule on the DL (associated with other STAs) that may impede DL traffic even if the DL AC and UL AC are made equivalent.

In accordance with some embodiments, the prioritization of DL traffic flow based on UL traffic flow for a particular application flow can be performed in conjunction with an AP upgrade. Accordingly, hardware processor 222 may execute instruction 246 to perform preferred DL scheduling. It should be understood that the DL traffic flow prioritization described above can be performed or used independently, or in addition to/conjunction with any other form of prioritization used for DL traffic, where some "net" prioritization can be achieved using multiple mechanisms (i.e., that described herein and another prioritization mechanism(s)).

Figure 3:
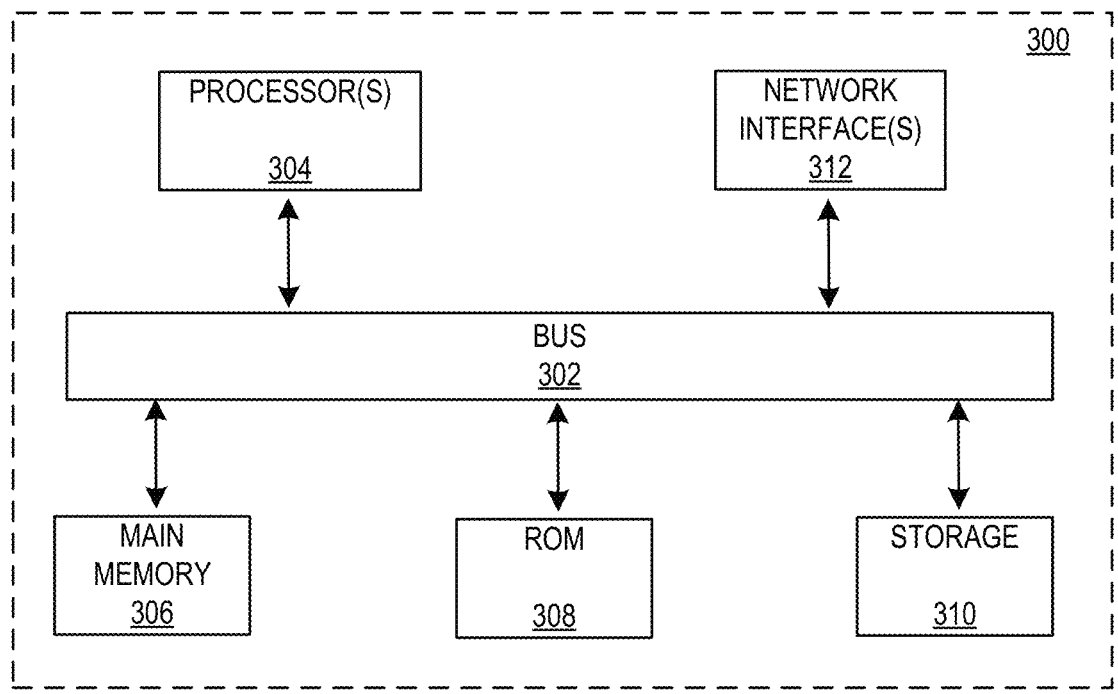
FIG. 3 illustrates an example computing component in which various embodiments described herein may be implemented.

FIG. 3 depicts a block diagram of an example computer system 300 in which various of the embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

The computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

Computer system 300 may further include at least one network interface 312, such as a network interface controller (NIC), network adapter, or the like, or a combination thereof, coupled to bus 302 for connecting computer system 300 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 310. Volatile media includes dynamic memory, such as main memory 306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 302. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for scheduling uplink (UL) traffic to a wireless local area network (WLAN) device, comprising:
    identifying a downlink (DL) traffic flow associated with a plurality of application flows of the WLAN device;
    determining a status of an UL buffer of each of the stations (STAs) associated with the plurality of application flows by:
        performing buffer polling on each of the STAs in real-time at determined intervals to estimate UL queue-depths,
        wherein the buffer polling comprises appending a Buffer Status Report Poll (BSRP) trigger frame to a WLAN Physical Layer Protocol Data Unit (PPDU) sent on a channel in the DL direction, and
        wherein the performance of the buffer polling occurs at a determined periodicity of the plurality of application flows;
    sorting each STA based on priorities of each of the plurality of application flows; and
    providing channel access in the UL to each sorted STA in a manner that is equivalent to the channel access provided to the identified DL traffic flows.

2. The method of claim 1, wherein the WLAN device comprises a device capable of scheduling UL traffic.

3. The method of claim 1, wherein the WLAN device comprises an access point.

4. The method of claim 1, wherein deep packet inspection is performed on the WLAN device to identify the DL traffic flows.

5. The method of claim 1, further comprising determining an access category (AC) of UL transmissions corresponding to each UL buffer.

6. The method of claim 5, further comprising specifying in a second trigger frame transmitted to each sorted STA, a preferred AC field indicative of an AC or set of ACs from which each sorted STA can dequeue packets for UL transmission.

7. The method of claim 6, wherein the AC or set of ACs is/are commensurate with an AC or set of ACs associated with each of the plurality of application flows.

8. The method of claim 6, further comprising optimizing resource unit (RU) size assigned to each UL transmission.

9. The method of claim 8, wherein the RU size associated with a sorted STA having a maximized priority value proportional to other application flows in the plurality of application flows.

10. The method of claim 6, further comprising:
  determining a UL transmission mode according to transmission factors associated with each UL transmission.

11. The method of claim 10, where the UL transmission mode comprises one of UL Multi-User, Multiple Input, Multiple Output (MU-MIMO) or UL Orthogonal Frequency Division Multiple Access (OFDMA) depending on a size of a UL queue-depth corresponding to the UL buffer of each sorted STA.

12. The method of claim 1, wherein the access channel is provided in the UL based on the priorities of each of the plurality of application flows.

13. A wireless local area network (WLAN) device comprising:
  a radio for transmitting and receiving a plurality of application flows with a plurality of stations (STAs);
  a memory; and
  a processor that are configured to execute machine readable instructions stored in the memory to:
   identify a downlink (DL) traffic flow;
   determine a status of an uplink (UL) buffer of each of the STAs by:
    performing buffer polling on each of the STAs in real-time at determined intervals to estimate UL queue-depths,
    wherein the buffer polling comprises appending a Buffer Status Report Poll (BSRP) trigger frame to a WLAN Physical Layer Protocol Data Unit (PPDU) sent on a channel in the DL direction, and
    wherein the performance of the buffer polling occurs at a determined periodicity of the plurality of application flows;
   sorting each STA based on priorities of each of the plurality of application flows; and
   providing channel access in the UL to each sorted STA in a manner that is equivalent to the channel access provided to the identified DL traffic flows.

14. The WLAN device of claim 13, wherein the WLAN device comprises a device capable of scheduling UL traffic.

15. The WLAN device of claim 13, wherein the WLAN device comprises an access point.

16. The WLAN device of claim 13, wherein deep packet inspection is performed on the WLAN device to identify the DL traffic flows.

17. The WLAN device of claim 13, wherein the processor further to:
  determine a UL transmission mode according to transmission factors associated with each UL transmission.

18. The WLAN device of claim 17, where the UL transmission mode comprises one of UL Multi-User, Multiple Input, Multiple Output (MU-MIMO) or UL Orthogonal Frequency Division Multiple Access (OFDMA) depending on a size of a UL queue-depth corresponding to the UL buffer of each sorted STA.

19. The WLAN device of claim 13, wherein the access channel is provided in the UL based on the priorities of each of the plurality of application flows.

\* \* \* \* \*